April 28, 1964     G. R. DEMPSTER ETAL     3,130,847
TRANSPORTING EQUIPMENT FOR CONTAINERS
Filed March 11, 1960     6 Sheets-Sheet 1

INVENTORS
GEORGE R. DEMPSTER,
WILLIAM A. HERPICH,

BY
ATTORNEYS

April 28, 1964

G. R. DEMPSTER ETAL 3,130,847

TRANSPORTING EQUIPMENT FOR CONTAINERS

Filed March 11, 1960

INVENTORS
GEORGE R. DEMPSTER,
WILLIAM A. HERPICH

BY

ATTORNEYS

April 28, 1964  G. R. DEMPSTER ETAL  3,130,847
TRANSPORTING EQUIPMENT FOR CONTAINERS
Filed March 11, 1960  6 Sheets-Sheet 4

INVENTORS
GEORGE R. DEMPSTER,
WILLIAM A. HERPICH,

BY

ATTORNEYS

April 28, 1964   G. R. DEMPSTER ETAL   3,130,847
TRANSPORTING EQUIPMENT FOR CONTAINERS
Filed March 11, 1960   6 Sheets-Sheet 6

INVENTORS
GEORGE R. DEMPSTER,
WILLIAM A. HERPICH,
BY Sinclair & Mathis
ATTORNEYS

United States Patent Office 3,130,847
Patented Apr. 28, 1964

3,130,847
TRANSPORTING EQUIPMENT FOR CONTAINERS
George R. Dempster, P.O. Box 3127, Knoxville 17, Tenn., and William A. Herpich, Galion, Ohio; said Herpich assignor to Dempster Brothers, Inc., Knoxville, Tenn., a corporation of Tennessee
Filed Mar. 11, 1960, Ser. No. 14,313
9 Claims. (Cl. 214—505)

This application is a continuation-in-part of our prior applications, Serial No. 744,107, filed June 24, 1958, now abandoned, Serial No. 800,320, filed March 18, 1959, and Serial No. 811,657, filed May 7, 1959.

This invention is related to improvements in container loading and unloading mechanism whereby one or more large size containers may be loaded and unloaded with respect to a transport vehicle that is separable therefrom.

It is often desirable to use large capacity containers for holding various types of lading and to provide for the picking up and unloading of the containers with respect to a vehicle so that the containers may be transported. Such a container may be filled when resting on the ground or other surface, after which it may be picked up by a vehicle and transported to a distant point where it can be unloaded from the vehicle or the contents discharged therefrom. If the container remains on the vehicle, it may be returned to the location of filling or to a new location and placed on the ground again for refilling.

Previous types of mechanism for picking up and unloading large containers from vehicles have used cable-type hoisting devices, but these have not been entirely satisfactory. The above-mentioned applications set forth mechanism which will accomplish this operation without the use of cables. Such mechanism instead uses hydraulically powered apparatus that is capable of handling only one container at a time. The container handled by this mechanism is usually the size of a normal truck body.

Although this mechanism and the containers have proved to be satisfactory in the past, for some applications of lading handling it is desirable that the hydraulically powered apparatus be capable of accommodating two containers which are generally one-half the size of the containers previously handled by such equipment.

One object of this invention is to improve the construction of equipment for handling a detachable body or container, or the loading and unloading of the same with respect to a vehicle chassis.

Another object of the invention is to provide mechanism for picking up and loading one, or more than one, large size container onto the chassis of a vehicle and for unloading the containers from the vehicle.

These objects may be accomplished according to one embodiment of the invention by constructing a detachable container with means on the body thereof which may be engaged selectively and successively for moving the container step-by-step in its progress on to and off the transport vehicle. The supporting structure of the separable container may be provided with a series of hook stations spaced at intervals along the length thereof in positions for successive engagement by a bail mechanism mounted on the tilting frame of the vehicle and reciprocated hydraulically for moving the separable container step-by-step onto and off the vehicle.

The vehicle chassis is constructed with a tilting frame mounted thereon and means are provided for raising and lowering the frame with respect to the chassis. A bail used for connection with the separable container preferably is mounted on a carriage which has guiding movement with respect to the tilting frame so as to permit the proper reciprocating movement of the bail lengthwise with respect to the container. The bail may be moved successively into engagement with hook stations provided on the container and the bail acts thereon step-by-step to cause movement of the separable container onto or off the tilting frame of the vehicle. This step-by-step movement is accomplished by a hydraulic power device connected between the tilting and the carriage to effect reciprocating action of the carriage.

In order to accommodate more than one separable container, a counterbalance latch is mounted on the carriage a distance forward of the bail and may be adjusted so as to engage or disengage the end of the container. The latch allows the power device to move a first container a greater distance onto the tilting frame than could be achieved by the bail alone. Locking means secure the first container to the tilting frame so that the bail may move a second container onto the tilting frame.

This embodiment of the invention is illustrated in the accompanying drawings in which:

FIG. 12 is an enlarged end elevation view of the counterbalancing latch;

The invention is illustrated as applied to a motor vehicle chassis of conventional form wherein the chassis frame, indicated generally at 2, is supported by a front wheel and axle assembly 4 and rear wheel and axle assemblies 6. The vehicle is power driven in the usual manner under control of an operator located within a cab 8.

The chassis frame should be of sufficient length to receive thereon and to accommodate two large size separable containers. If desired, the chassis frame may be that of a conventional trailer, separated from the tractor portion of the vehicle, although functioning otherwise in the same manner as described.

Figure 6:
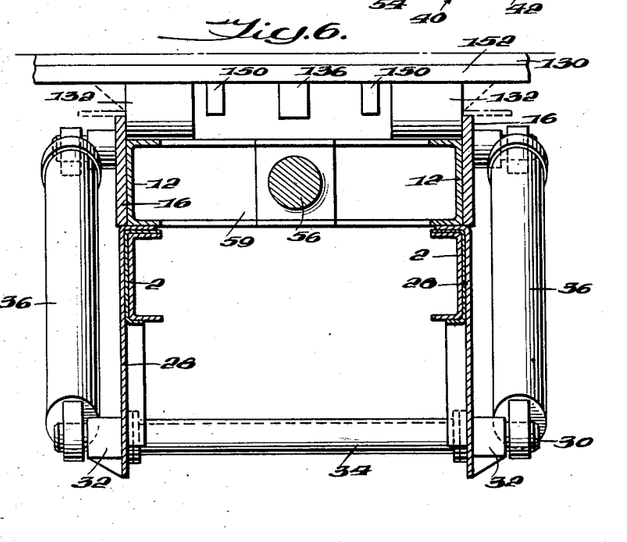
FIG. 6 is a detail cross section view taken along line 6—6 in FIG. 2.

Mounted on the chassis frame 2 is a tilting frame, generally indicated at 10, in such position as to be disposed directly over the chassis frame 2 as will be apparent from FIG. 6. The tilting frame 10 extends lengthwise of the chassis frame 2 and includes a pair of longitudinal channel members 12 on opposite sides of the tilting frame in vertical alignment with the sides of the chassis frame 2. The channels 12 are suitably braced and spaced apart by intermediate connecting members which cooperate to form a unitary structure. On the outer faces of the channel members 12 are upstanding side plates 16 adapted to form opposite members of a guideway for slidably receiving the subframe of the container therebetween, which container slides upon the upper faces of the channels 12. These plates 16 may be welded or otherwise secured rigidly to the longitudinal channel members 12 of the tilting frame 10.

At the rear end of the chassis frame 2, at each lateral side thereof, is a depending bracket 18. Supported upon the bracket 18 is a pivot shaft 20 upon which brackets 22 are pivotally supported. The brackets 22 are connected rigidly with the rear end portion of the tilting frame 10. The tilting frame 10 in this manner is pivotally mounted on the chassis 2 for swinging movement relative thereto as illustrated throughout FIGS. 1–5.

Figures 1, 2:
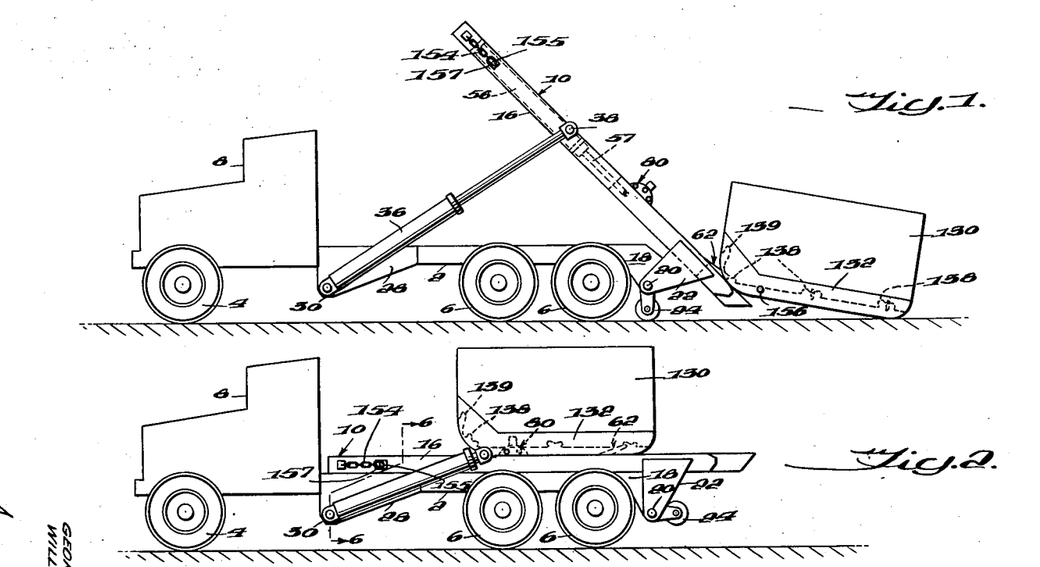
FIG. 1 is a side elevation view showing a vehicle chassis having the invention applied thereto, with the tilting frame raised and the bail engaging a separable container.
FIGS. 2–5 are similar side elevation views showing various steps in the loading of a first and a second container onto the vehicle chassis.
Figure 3:
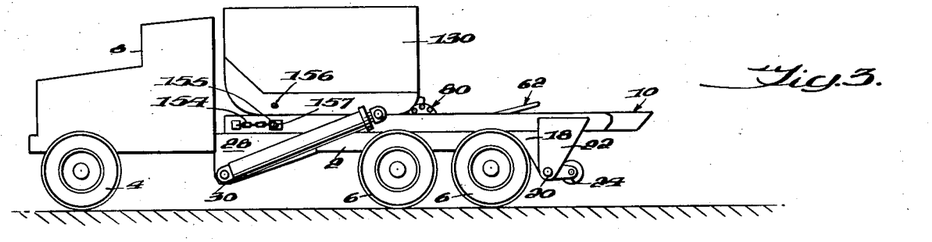
Figure 4:
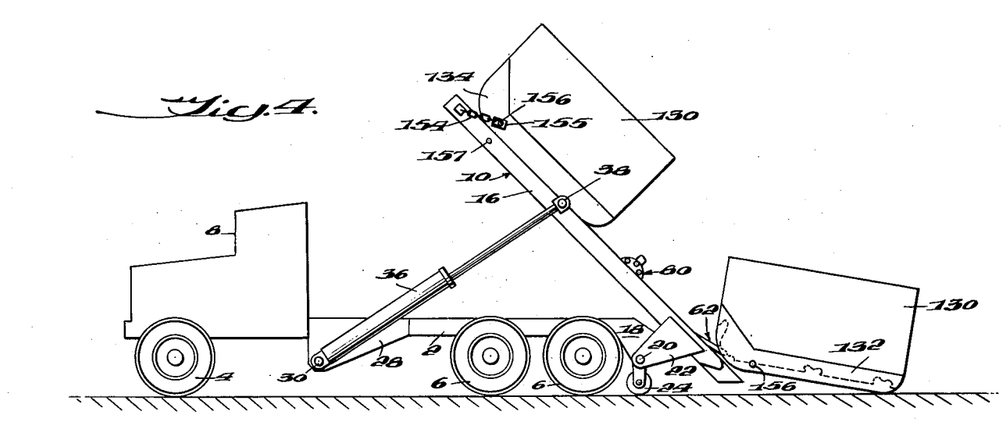

The rear end portion of the tilting frame 10 may be provided with a stabilizing jack, if desired or needed, especially for accommodating abnormally heavy loads. One form of jack is shown in FIG. 1–5 as including a roller 24 mounted with respect to the pivot shaft 20 for raising and lowering movements with respect thereto under control of a suitable power device. In FIGS. 1 and 4, the roller 24 is shown to be lowered, while in FIGS. 2, 3 and 5, it is raised. Reference may be made to our above-mentioned application, Serial No. 811,657, filed May 7, 1959, wherein such a roller device is described in detail.

At the forward end portion of the tilting frame 10, the chassis frame 2 is provided with depending brackets 28, welded or otherwise secured rigidly to the members of the chassis frame, as shown in FIG. 6. The brackets 28 mount a cross shaft 30 which is journaled in bearings 32 secured to the outer sides of the brackets 28. The shaft 30 extends through a spacing member 34 interposed between the inner faces of the brackets 28 to hold them suitably braced and in rigid relation.

Figure 5:
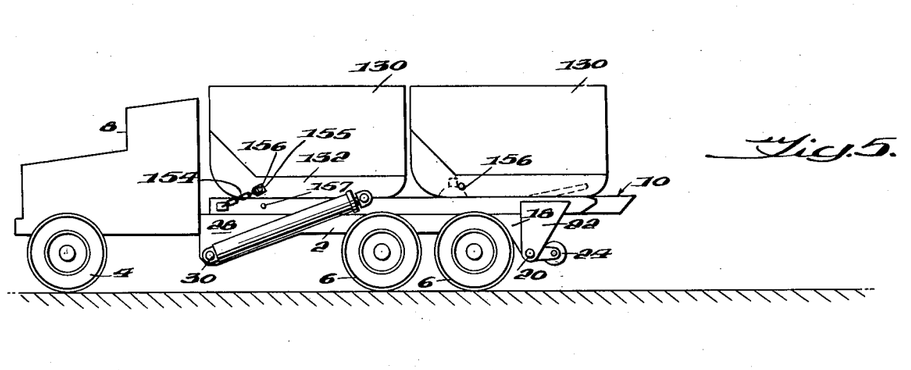

Mounted on the outer projecting ends of the shaft 30 are the lower ends of hydraulic power devices or cylinders 36, the upper ends of which are pivotally connected at 38 with opposite sides of the tilting frame 10. The hydraulic power devices 36 are of any suitable or desired form, with a cylinder and piston assembly for each, capable of telescoping movement in raising and lowering the tilting frame 10 relative to the chassis frame 2. For example, the tilting frame 10 is capable of raising and lowering movements between a lowered position as shown in FIGS. 2, 3 and 5, and a varied position as shown in FIGS. 1 and 4.

Figure 7:
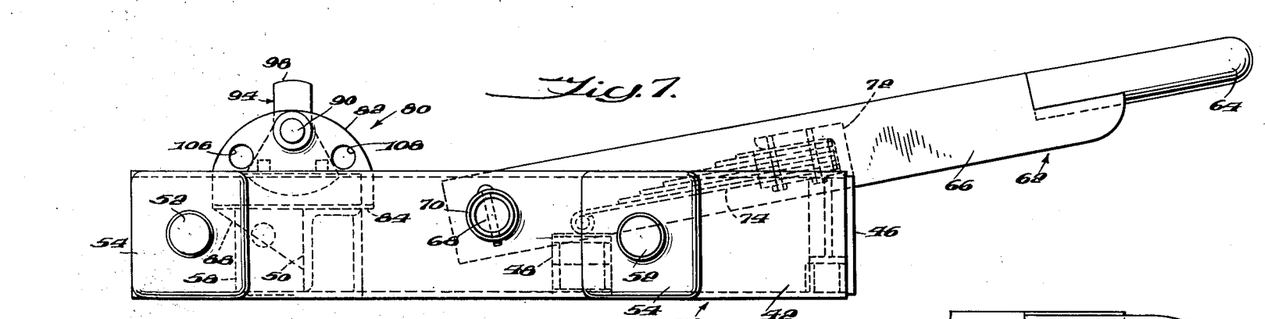
FIG. 7 is a side elevation view of the counterbalancing latch, the bail, and the carriage structure.
Figure 8:
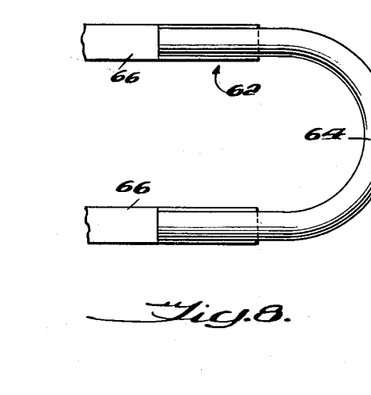
FIG. 8 is a top plan view of a fragment of the bail.
Figures 9, 10, 11:
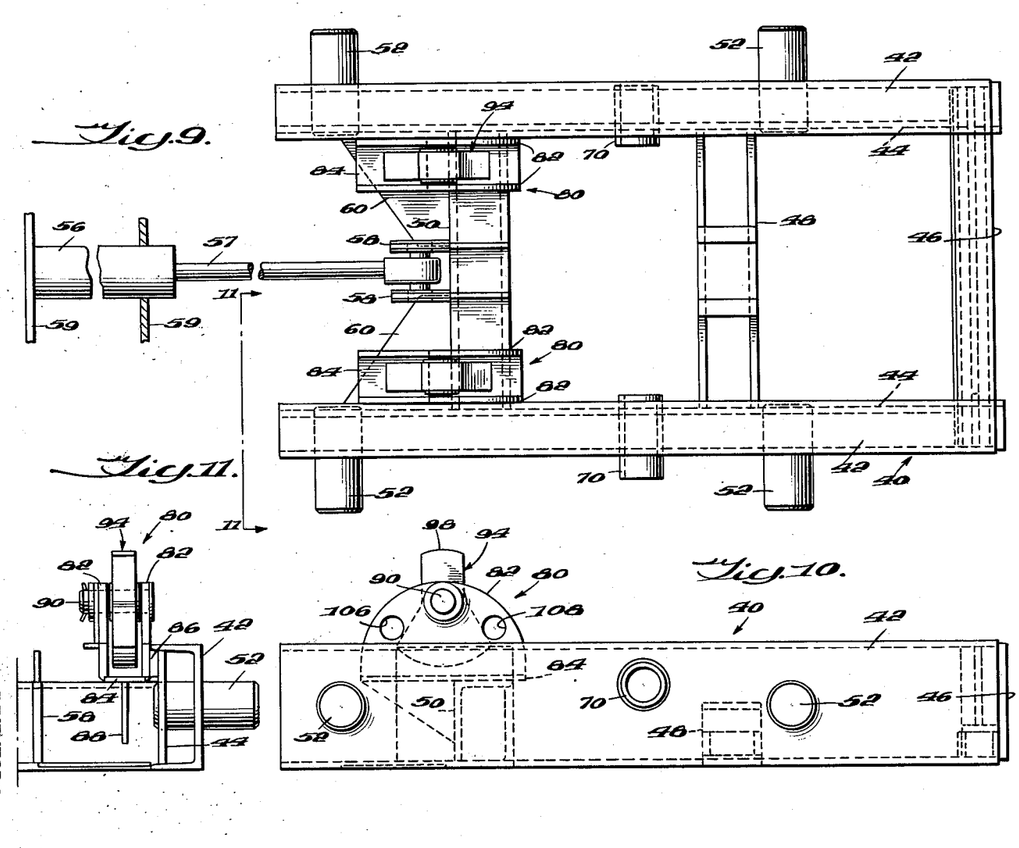
FIG. 9 is a top plan view of the carriage and its power cylinder.
FIG. 10 is a side elevation view of the carriage structure shown in FIG. 9.
FIG. 11 is an end elevation view taken along line 11—11 in FIG. 9.

The channel members 12 of the tilting frame 10 form opposed trackways, receiving therebetween a carriage 40 (FIGS. 7, 9 and 10). The carriage 40 includes a pair of longitudinal channel-shaped side rails 42 spaced-apart and located in relatively close relation to the inner faces of the channel members 12. These longitudinal side members 42 are suitably held in spaced relation and braced by longitudinal plate members 44, fitted between the flanges of the channels 42, and cross members 46, 48 and 50.

Mounted on the respective side members 42 and extending laterally in opposite directions therefrom at longitudinally spaced points are suitable axles 52. Mounting members 54 (FIG. 7) are supported on the axles 52 and may be in the form of rollers, if desired, although slides or other suitable means may be employed, such as the block-shaped members shown. These form bearing supports within the channels 12 for guiding the carriage 40 lengthwise of the tilting frame 10 during reciprocating movements.

Such reciprocating movements of the carriage 40 are accomplished by a hydraulic power device comprised of the usual telescoping cylinder 56 and piston rod 57 capable of expanding and contracting movements for pushing or pulling the carriage 40 lengthwise of the tilting frame 10 upon operation thereof. The rod 57 is connected at its rear end to brackets 58 which are made rigid with the carriage structure by gussets 60. The cylinder 56 at its forward end is connected to suitable cross brace members 59 within the tilting frame 10.

Mounted on the carriage 40 is a container connecting member or bail 62 comprised of a closed or loop section 64, at the rear end thereof, and side members 66. The bail side members 66 extend forward to the carriage 40 between the side rails 42 thereof, and are supported at their forward ends on a pivot rod 68 which extends between the side rails 42. Bushings 70 are mounted in the side rails 42 to receive the rod 68, and with this arrangement the bail 62 may swing vertically relative to the carriage 40 about the axis of the rod 68.

The bail side members 66 are spaced apart intermediate their ends by a spacer bar 72 (FIG. 7). Connected to the bar 72 as by bolts is a leaf-spring assembly 74 which extends to and has its free end bearing upon the cross member 48. The leaf-spring 74 is in the nature of a cantilever spring and by rocking and sliding motion with respect to the cross member 48 imparts a force to the intermediate portion of the bail 62 which tends to hold the bail in an elevated position relative to the carriage 40 as illustrated in FIG. 7.

For a further explanation of the frame, carriage and bail, reference may be made to our above-mentioned applications, Serial No. 744,107, filed June 24, 1958, and Serial No. 800,320, filed March 18, 1959.

Figure 13:
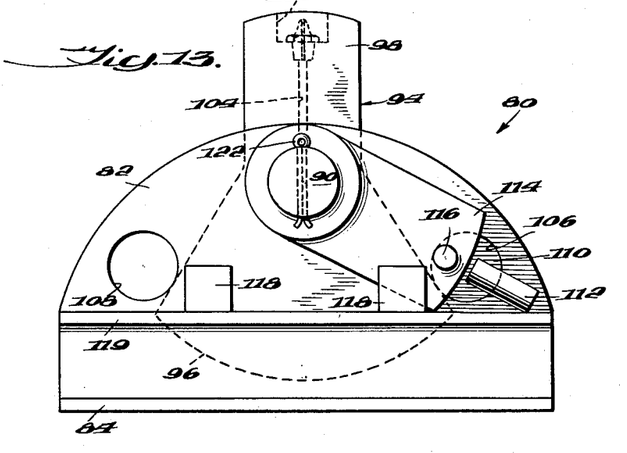
FIG. 13 is an enlarged side elevation view of the counterbalancing latch.
Figure 14:
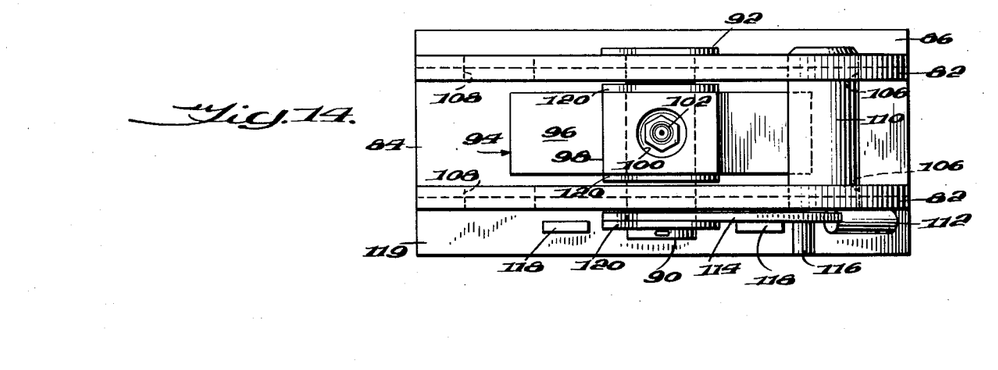
FIG. 14 is a top plan view corresponding to FIG. 13.

Counterbalance latch devices 80 are mounted on the carriage 40 forward of the bail 62. The position of the latch devices 80 on the carriage is shown in FIGS. 7, 9, 10 and 11. Details of one of the latch devices 80 is shown in FIGS. 12 to 14 and operation of the latch devices is represented diagrammatically in FIGS. 15 and 16.

Each latch device 80 includes an assembly of a pair of vertically extending plates 82 fixed as by welding to a horizontal plate 84. This assembly is rigidly connected as by welding to a side rail 42 of the carriage 40 and to the cross member 48. A spacer member 86 between the outside plate 82 and the vertical plate 44 of the carriage 40 strengthens the connection as does a gusset plate 88 between the horizontal plate 84 and the cross member 50.

A pivot pin 90 having a head 92 is carried by and extends between the pair of plates 82, and supports for swinging movements a latch 94. This latch 94 has a lower triangular portion 96 which overbalances an upwardly extending arm portion 98 so that in a rest position the arm 98 will extend vertically upward above the top edge of the plates 82. A cavity 100 in the top side of the arm 98 receives a grease fitting 102 which connects with a passage 104 leading to the contact surface between the latch 94 and the pivot pin 90.

Both plates 82 are provided with holes 106 and 108. The pair of holes 106 are aligned at the forward end of the plates 82 and the pair of holes 108 are aligned at the rear end of the plates 82. The pair of holes 106 and 108 are spaced apart a distance approximately equal to the width of the triangular portion 96, and their center line axes extend perpendicularly to the longitudinal axis of the carriage 40.

A latch bolt 110 having a handle 112 may be placed through either pair of holes 106 or 108. FIGS. 12 to 14 show the bolt 110 in the holes 106. The handle 112 provides for easy insertion and removal of the bolt 110 and prevents the bolt 110 from passing all the way through the holes as can be visualized from FIGS. 12 to 14. The end of the bolt 110 opposite the handle 112 is tapered slightly to provide for easy alignment with the holes when being inserted.

A keeper bar 114 having a handle 116 is supported by and swingable about the pivot pin 90 closely adjacent to the inside plate 82. The keeper bar 114 may be swung to extend over a substantial part of either hole 106 or 108 in the inside plate 82, or may be swung to a position away from the holes. The bar 114 serves to retain the bolt 110 in the holes. Upwardly protruding ears 118 fixed to a shelf 119 which is secured to the inside plate 82 prevent lateral movement of the keeper bar 114 and thereby assist the bar in preventing accidental removal of the bolt 110 from the holes. The shelf 119 provides a downward limit to the swinging movement of the bar 114 in order to keep the bar in line with the holes.

Suitable washers 120 may be placed on the open end of the bolt 110 and adjacent to the latch 94, and a retaining element such as a cotter pin 122 may be used to cooperate with the head 92 of the pin 90 to keep the various elements in the assembled relationship as described.

It should now be apparent that the keeper bar 114 may be swung to allow the bolt 110 to be inserted into either pair of holes 106 or 108, and that the bar 114 serves to hold the bolt 110 in either pair of holes. With the bolt 110 removed from both holes 106 and 108, the latch 94 is free to pivot about the pin 90 in a vertical plane in either direction. If the bolt 110 is inserted in the holes 106, as shown in FIGS. 12 to 14, the upwardly extending arm 98 of the latch 94 is prevented from swinging counterclockwise, with reference to FIG. 12, but is free to swing clockwise. If the bolt 110 is inserted in the holes 108, the latch is prevented from swinging clockwise but may swing counterclockwise. The lower triangular portion 96 of the latch 94 tends to keep the arm 98 in upright position because of the distribution of the weight of the various portions of the latch about the pin 90.

Figure 15:
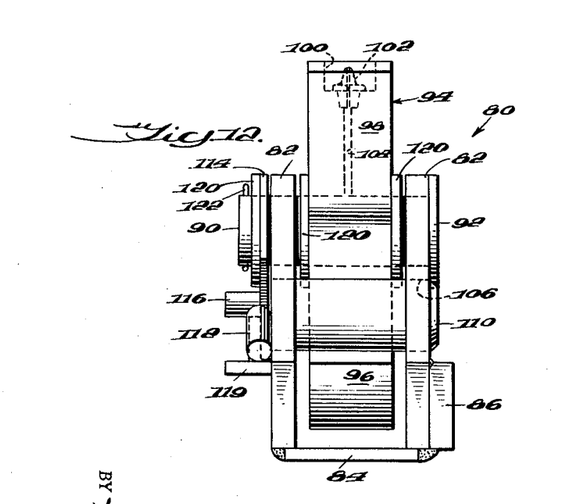
FIGS. 15 and 16 are side elevation views showing the counterbalance latch in various positions, and fragments of the carriage, the bail, and a separable container.
Figure 16:
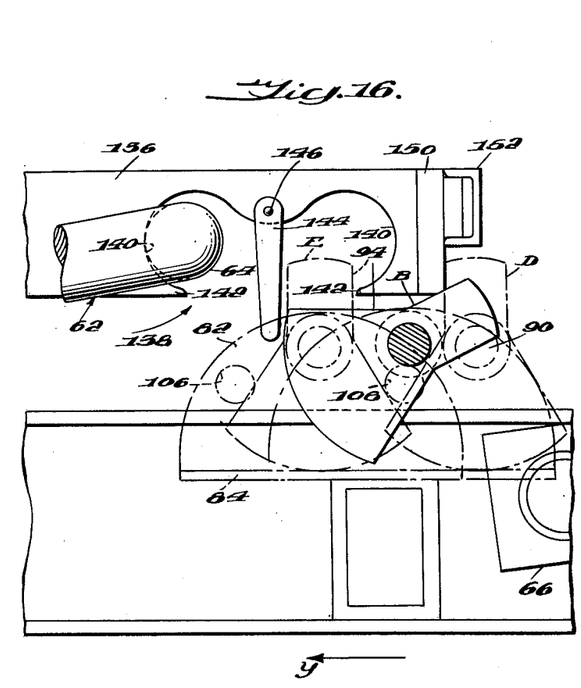

The detachable container used in connection with the vehicle and tilting frame structure is illustrated in FIGS. 1 to 5, and also fragments of the container are shown in FIGS. 6, 15 and 16, as indicated by reference numeral 130. The dimension of the containers from front to rear should be proportioned so that two such containers may be received by the chassis frame 2 of the vehicle as shown in FIG. 5. Except for this one dimension of the containers, they may be of any suitable size and type as desired. For example, they may have an open or a closed top, and have various combinations of lids, doors, and tail gates. The character of the containers depends on the type of material to be handled.

Each container 130 is provided with a subframe which includes beams 132 extending lengthwise thereof. These beams 132 form runners for supporting the container 130 upon the top surfaces of the tilting frame side members 12 between the side plates 16 (FIG. 6). The forward ends 134 of the beams 132 are curved upwardly in the form of bows to facilitate the guiding of the container 130 onto the tilting frame. Suitable braces and ribs may be employed as necessary to strengthen the container.

Extending lengthwise of the container 130 intermediate the beams 132 is a hook bar 136 which extends preferably throughout the length of the container. The hook bar 136 is provided with a plurality of hook stations 138, one of which is shown in detail in FIGS. 15 and 16, spaced along the length thereof for engagement of the loop portion 64 of the bail 62 in moving the container onto or off the tilting frame 10. The hook bar 136 also is provided with a forwardmost hook station 139 located in an upturned portion of the hook bar (FIG. 1). The number and spacing of the hook stations 138 may vary depending upon the length of the container and the length of travel of each stroke of the bail 62.

Each hook station 138 is formed with a pair of opposed hook surfaces 140 opening downwardly and with the lips 142 of the hooks in positions to be overlapped alternately by a shuttle 144. The shuttle 144 is pivoted at 146 on hook bar 136 for swinging movement, but normally hangs downwardly in the position shown in FIGS. 15 and 16.

By proper operation of the cylinder 56, the operator can move the carriage 40 and thus the bail 62 so that the loop portion 64 will engage either the rear hook surface or the forward hook surface 140 of the hook station 138. The shuttle 144 allows the bail 62 to be moved past the hook station 138 without engaging the hook surface 140. However, upon a slight reverse movement of the bail, the loop portion 64 will move the shuttle 144 away from the lip 142 and slide easily into contact with a hook surface 140.

The container structure and its cooperation with the bail is further explained in our above-mentioned applications Serial No. 744,107, filed June 24, 1958, and Serial No. 800,320, filed March 18, 1959, to which reference may be made for a further explanation thereof.

The rearwardmost part of the container 130 is provided with downwardly extending lugs 150 (FIGS. 6, 15 and 16) which are rigidly fixed to a laterally extending member 152 of the container. These lugs 150 are longitudinally aligned with and adapted to be engaged by the upwardly extending arms 98 of the latches 94 which are part of the latch devices 80. This engagement takes place when the container is on the tilting frame 10.

Connecting means are provided for anchoring a first container 130 to the front part of the tilting frame 10 and may include, for example, a pair of locking chains 154 at opposite sides of the tilting frame 10 fixed at one end to the sides of members 12. One such chain 154 is shown in FIGS. 1 to 5. The free end of the chain 154 is provided with a plate 155 having therein a slot which may be of key-hole shape. The containers 130 are provided with pins 156 fixed on the beams 132 near the front part thereof. When the container is positioned on the front part of the tilting frame 10, the chains 154 may be connected to the container by fitting the plates 155 on the pins 156 thereby anchoring the container on the tilting frame, as shown in FIGS. 4 and 5. When the chains 154 are not in use to hold the container on the tilting frame, the plates 155 may be fitted on pins 157 fixed on the side members 12, as shown in FIGS. 1, 2 and 3.

The containers 130 may be filled, if desired, separate and apart from the vehicle chassis, while sitting on the ground or on some other supporting surface. The structure here involved may be used for picking up one or two of the containers, loading them on the chassis and transporting them to a remote point where they can be removed from the chassis. This enables one truck to service a multiplicity of containers and yet it is possible for the containers to be of large size and capacity. The size of two of the containers may compare to that of a normal truck body. Any type of lading that is suitable for the containers may be handled.

In picking up or loading the first container 130, the vehicle is backed up to the front end portion of the container, while the latter is resting on the ground or other supporting surface, so that the rear of the vehicle is at or in close proximity to the front end of the container. Then, upon operation of the cylinders 36, the tilting frame 10 can be moved to an upwardly inclined position about its pivot shaft 20, as shown in FIG. 1.

If the stabilizing jack is used the roller 24 may be swung into engagement with the ground. This will aid in supporting the load on the tilting frame 10 during the pulling of the container onto the vehicle.

With the tilting frame 10 up, the operator then energizes the cylinder 56 to move the carriage 40 to the lower end of the tilting frame 10. The bail 62 normally is in the raised position with respect to the carriage 40, as shown in FIG. 7. The bail 62 will be projected below the lower end of the inclined tilting frame 10 and beneath the forward end portion of the container 130.

If the vehicle and the container are properly aligned, the bail 62 will be centered under the front portion of the hook bar 136. By the action of the cantilever leaf-spring assembly 74, the bail 62 normally will be urged in an upward direction to an elevation sufficiently high so as to engage either the front hook station 139 or the front hook station 138. The angle of the tilting frame 10 may be varied under control of the operator by proper manipulation of the cylinders 36, so as to cause the bail 62 to enter either of these hooks as desired.

After hook engagement with the container in this manner, the operator may then actuate the cylinder 56 to move the carriage 40 toward the front of the vehicle through a full stroke of the cylinder 56 or through a partial stroke as desired. This will pull the container 130 onto the tilting frame 10. Thereafter, the carriage 40 and bail 62 can be moved rearwardly so that the loop portion 64 of the bail might engage an intermediate or the rearmost hook station 138. Upon forward movement of the carriage again, the container 130 will be pulled further onto the tilting frame 10. As the container is pulled on the tilting frame, the beams 132 will skid along the upper surface of the side members 12 between the plates 16. While the container is being pulled onto the tilting frame 10, the operator may lower the tilting frame by proper manipulation of the cylinders 36.

When the bail 62 is in engagement with the rearmost hook station 138, the maximum distance that the container 130 can be moved onto the tilting frame is midway of the chassis 2, as shown in FIG. 2. This is because the forward movement of the carriage 40 is limited by the stroke of the rod 57, and consequently, the bail 62 will advance only a short distance toward the front of the chassis. Generally, this is sufficient if only one container is to be loaded onto the vehicle. If two containers are to be loaded, the first container must be moved all the way to the forward part of the tilting frame 10.

The next step then, when loading two containers onto the vehicle, is to move the carriage 40 rearwardly far enough so that the counterbalance latch devices 80 are to the rear of the container 130. This is done so that the latch devices 80 may be used to move the container to the extreme forward part of the tilting frame 10, as shown in FIG. 3, by operation of the carriage 40.

With reference now to FIGS. 15 and 16, several positions of the latches 94 are shown in order to facilitate an understanding as to the operation of the latch devices 80. Various parts of the latch device 80 and the container 130 have been omitted for clarity.

When the bolt 110 has not been inserted into either pair of holes 106 or 108, the latch 94 can swing freely in either direction as it contacts the lug 150 on the container 130 during rearward movement of the carriage 40 indicated by arrow x in FIG. 15, or during forward movement of the carriage as indicated by arrow y in FIG. 16. The position A (FIG. 15) of the latch 94 shows the latch swinging as the carriage 40 moves rearwardly, and position B (FIG. 16) shows the latch swinging as the carriage moves forwardly.

In order to move the container 130 from the position shown in FIG. 2 to the extreme forward part of the tilting frame 10 as shown in FIG. 3, the carriage 40 is moved rearwardly far enough so that the latch 94 is to the rear of the lug 150 as indicated by position C (FIG. 15). The bolt 110 is then inserted into the front pair of holes 106. This prevents the latch 94 from rotating clockwise with reference to FIG. 15.

Then the carriage 40 is moved forwardly by the cylinder 56 so that the latch, without rotating, engages the bar 150 as indicated by position D (FIG. 16). Continued operation of the cylinder 56 will draw the carriage 40 forwardly together with the container 130 until the latter is properly positioned at the front part of the tilting frame 10, as shown in FIG. 3. The container 130 is then anchored securely to the tilting frame 10 by connecting the locking chains 154 to the pins 156 on the container.

A second container 130 may be loaded onto the vehicle in a manner identical to that followed for loading the first container. One of the steps of this operation is illustrated in FIG. 4, wherein the tilting frame 10 has been raised by operation of the cylinders 36 and the carriage 40 moved rearwardly so that the bail 62 may engage the hook station 139 or one of the hook stations 138.

During the reciprocating movement of the carriage 40, while pulling the second container 130 onto the tilting frame 10, the latch devices 80 will move past the lugs 150 of the first container. To prevent interference of the latches 94 with the lugs 150, the bolts 110 are removed so that the latches may swing freely as indicated by positions A and B in FIGS. 15 and 16, respectively. The vehicle with two containers 130 loaded thereon is shown in FIG. 5 and is now ready to transport the containers to a new location.

In order to unload or discharge the second or last container 130 from the vehicle, the loading operation is reversed. The loop 64 of the bail 62 is engaged in one of the rear hook stations 138 of the second container, and the carriage 40 is moved to the rear of the tilting frame 10. This reverse movement of the carriage 40 and the container will continue step-by-step until the container has slid off the tilting frame. The tilting frame can be varied in its angle of tilting movement from horizontal to inclined, in order to facilitate the unloading of the container. The container can be set on a loading dock, railroad car, or other platform that is no higher than the tilting frame in level position, or the container can be set on the ground. If the container is to be set on a platform, the tilting frame may not be elevated, or elevated only slightly. The final removal of the container from the tilting frame is completed by pushing the container or by pulling the vehicle away.

The first or frontmost container 130 may be unloaded or discharged from the vehicle after the locking chains 154 have been removed from the pins 156. The carriage is moved forward until the latch 94 is in front of the bar 150 of the container as shown by position E (FIG. 16), and as the carriage 40 continues to move rearwardly, the container 130 will be moved with it. After the container has been moved to the rear of the tilting frame in this manner, the bail 62 is then able to engage one of the hook stations 138, and thereafter the container can be unloaded from the vehicle similarly as the rearmost container described above.

It will be apparent that the mechanism described is quite versatile in transporting large size containers to various locations. Two containers can be picked up at different locations and transported to the same or to different discharge points. If desired, only one such container 130 as shown may be transported by the vehicle. Of course, without using the latch devices, the mechanism can be used to load and unload a single container which is approximately twice the size of the container 130 illustrated.

While the invention has been illustrated and described in a certain embodiment, it is recognized that other variations and changes may be made therein, without departing from the invention as set forth in the claims.

We claim:

1. In a container loading and unloading mechanism of the character described, the combination of a longitudinally extending frame adapted to receive and support thereon a container, a carriage supported and guided by the frame for reciprocating movement longitudinally with respect thereto, first container engaging means connected to the carriage for movement therewith, and second container engaging means connected to the carriage for movement therewith and spaced longitudinally from the first means, said second means comprising a pair of spaced apart, vertically extending plates having pairs of aligned holes therein, a pin extending between the plates, a latch pivotally supported by the pin between the plates, and a bolt adapted to be inserted in one of the pair of holes for preventing pivoting of the latch in one pivotal direction or removed therefrom for allowing pivoting of the latch.

2. In transporting equipment of the character described, the combination of a separate container, an elongated frame adapted to be mounted on a vehicle and to receive and support thereon the separate containers, first and second container engaging means mounted on a carriage on the frame for reciprocating movement longitudinally with respect thereto, and adapted to be used sequentially, each container engaging means having opposed surfaces thereon for pulling or pushing the container, respectively, said first and second container engaging means being spaced apart longitudinally of the frame, the first container engaging means having a path of reciprocating movement at one end of the frame whereby the first container engaging means can engage the container for pulling or pushing the container onto or off the frame, the second container engaging means having a path of reciprocating movement extending farther toward the opposite end of the frame than the path of the first container engaging means whereby the second container engaging means can engage the container after the container is on the frame to move the container toward the opposite end of the frame beyond the path of the first container engaging means or away from the opposite end of the frame over the path of the first container engaging means, said second container engaging means including means for selectively rendering the second container engaging means operative to engage the container for pulling or pushing the container, or for rendering the second container engaging means inoperative when the first container engaging means is pulling or pushing the container to prevent interference with the container.

3. In transporting equipment of the character described, the combination of two separate containers, an elongated frame adapted to be mounted on a vehicle and to receive and support thereon the separate container, first and second container engaging means mounted on a carriage on the frame for reciprocating movement longitudinally with respect thereto, and adapted to be used sequentially, each container engaging means having opposed surfaces thereon for pulling or pushing the container, respectively, said first and second container engaging means being spaced apart longitudinally of the frame, the first container engaging means having a path of reciprocating movement at one end of the frame whereby the first container engaging means can engage the containers one at a time for pulling or pushing the containers onto or off the frame, the second container engaging means having a path of reciprocating movement extending father toward the opposite end of the frame than the path of the first container engaging means whereby the second container engaging means can engage one of the containers after the container is on the frame to move the container toward the opposite end of the frame beyond the path of the first container engaging means so that the first container engaging means can pull the other container onto the frame, said second container engaging means including means for selectively rendering the second container engaging means operative to engage the containers for pulling or pushing the containers, or for rendering the second container engaging means inoperative when the first container engaging means is pulling or pushing one of the containers to prevent interference with the containers.

4. In equipment mounted on a vehicle, the combination of a container device adapted to be moved onto or off the vehicle, said container device having a first series of engagement surfaces by which the container can be moved in one direction with respect to the vehicle and a second series of engagement surfaces by which the container device can be moved in the opposite direction, a carriage mounted on the vehicle for guided reciprocating movement with respect thereto, a connecting member mounted on the carriage in position to engage either the first or the second engagement surfaces, means for preventing the connecting member from engaging one series of engagemnet surfaces when the other series of engagement surfaces is being used, power means for propelling the carriage and connecting member in reciprocating movement whereby the connecting member engages one engagement surface of one series to move the container device in one direction, disengages therefrom and engages another engagement surface of the same series to move the container device farther in the same direction, and means on the carriage operable sequentially with the connecting member to engage and move the container in either direction and adapted to be inoperative when the connecting member is moving the container to avoid interfering with the container.

5. In equipment mounted on a vehicle, the combination of a container device adapted to be moved onto or off the vehicle, said container device having a first series of engagement means by which the container can be moved in one direction with respect to the vehicle and a second series of engagement means by which the container can be moved in the opposite direction, a carriage mounted on the vehicle for guided reciprocating movement with respect thereto, a connecting member mounted on the carriage in position to engage either the first or the second engagement means for pulling or pushing the container device, respectively, in either direction, means for placing one series of engagement means in non-interfering condition when the other series is being used, power means for propelling the carriage and connecting member in reciprocating movement whereby the connecting member engages one engagement means of one series to move the container device in one direction, disengages therefrom and engages another engagement means of the same series to move the container device farther in the same direction, and means on the carriage operable sequentially with the connecting member to engage and move the container in either direction and adapted to be inoperative when the connecting member is moving the container to avoid interfering with the container.

6. In equipment mounted on a vehicle, the combination of a container device adapted to be moved onto or off the vehicle, said container device having first engagement means by which the container device can be moved onto the vehicle and second engagement means by which the container device can be moved off the vehicle, a carriage mounted on the vehicle for guided reciprocating movement with respect thereto, a connecting member mounted on the carriage in position to engage either the first or the second engagement means for pulling or pushing the container device, respectively, in either direction, means for preventing the connecting member from engaging the second engagement means when the container device is being moved onto the vehicle and for preventing the connecting means from engaging the first engagement means when the container device is being moved off the vehicle, power means for propelling the carriage and connecting means in reciprocating movement whereby the connecting means engages one of the first engagement means to move the container device onto the vehicle, disengages therefrom and engages another of the first engagement means to move the container device farther onto the vehicle, or engages one of the second engagement means to move the container device off the vehicle, disengages therefrom and engages another of the second engagement means to move the container device farther off the vehicle, latch means on the carriage operable sequentially with the connecting member for moving the container in either direction, and means for selectively rendering the latch means operative for engagement with the container or inoperative.

7. In equipment mounted on a vehicle, the combination of a container adapted to be moved onto or off the vehicle, said container having a plurality of engagement means by which the container can be moved onto or off the vehicle and also having opposed abutment means adjacent one end thereof, a carriage mounted on the vehicle for guided reciprocating movement with respect thereto, a connecting member mounted on the carriage in position to engage the engagement means for pulling or pushing the container in either direction, means for preventing or allowing engagement of the connecting member and engagement means upon selected movement of the carriage, latch means spaced from the connecting member and pivotally mounted on the carriage in position for engagement with the abutment means on the container, means for selectively preventing pivotal movement of the latch means in either rotational direction so that the latch means can engage the abutment means to move the container in either direction or for allowing pivotal movement so that the latch means will not operatively engage the abutment means, and power means for propelling the carriage in reciprocating movement whereby the connecting member and the latch means sequentially engage and move a container onto or off the vehicle.

8. In equipment mounted on a vehicle, the combination of a container adapted to be moved onto or off the vehicle, said container having a plurality of hook stations spaced-apart thereon and engagement means at one end of the container, each of the hook stations including a pair of hook surfaces arranged in opposed relation, a carriage mounted on the vehicle for guided reciprocating movement with respect thereto, a bail mounted on the carriage in position to engage the hook surfaces, means for preventing the bail from engaging respective hook surfaces depending on the direction the container is to be moved, latch means mounted on the carriage spaced from the bail and in position to engage the engagement means but normally inoperative, power means for propelling the carriage, the bail and the latch means in reciprocating movement whereby the bail engages a hook surface of one hook station to move the container in one direction, disengage therefrom and engages the corresponding hook surface of another hook station to move the container farther in the same direction, and means for rendering the latch means operative to engage the engagement means to move the container in the same direction after the bail has moved the container onto the vehicle.

9. In equipment mounted on a vehicle, the combination of a container adapted to be moved onto or off the vehicle, said container having a plurality of spaced-apart hooks by which the container can be moved relative to the vehicle and also having a depending lug with opposed contact surfaces adjacent the rear of the container, a carriage mounted on the vehicle for guided back and forth movement with respect thereto, a bail mounted on the carriage in position to engage the hooks for moving the container, a latch spacd forwardly of the connecting member in position for engagement with the lug, means for mounting the lug on the carriage to allow movement of the lug out of operative engagement with the container as the carriage moves back and forth, and means for making the latch operative to engage either contact surface by preventing said movement.

References Cited in the file of this patent

UNITED STATES PATENTS

| | | |
|---|---|---|
| 1,736,935 | Navarre | Nov. 26, 1929 |
| 1,821,327 | Scott | Sept. 1, 1931 |
| 1,830,740 | Leech et al. | Nov. 3, 1931 |
| 1,910,398 | Ludington | May 23, 1933 |
| 2,225,532 | Decker | Dec. 17, 1940 |
| 2,266,791 | Norbom | Dec. 23, 1941 |
| 2,287,068 | Shonnard | June 23, 1942 |
| 2,516,881 | Jarvis | Aug. 1, 1950 |
| 2,591,153 | Hodges | Apr. 1, 1952 |
| 2,606,676 | Dempster | Aug. 12, 1952 |
| 2,613,827 | Van Doorne | Oct. 14, 1952 |
| 2,867,339 | Nelson | Jan. 6, 1959 |
| 2,900,922 | Edmonds | Aug. 25, 1959 |